US007600241B2

(12) United States Patent
Zigmond et al.

(10) Patent No.: US 7,600,241 B2
(45) Date of Patent: Oct. 6, 2009

(54) DOCUMENT DATA STRUCTURE AND METHOD FOR INTEGRATING BROADCAST TELEVISION WITH WEB PAGES

(75) Inventors: Daniel J. Zigmond, Menlo Park, CA (US); David R. Anderson, Saratoga, CA (US); Dean J. Blackketter, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1210 days.

(21) Appl. No.: 10/892,917

(22) Filed: Jul. 16, 2004

(65) Prior Publication Data

US 2004/0268405 A1 Dec. 30, 2004

Related U.S. Application Data

(63) Continuation of application No. 09/467,764, filed on Dec. 20, 1999, now Pat. No. 6,785,902.

(51) Int. Cl.
*G06F 13/00* (2006.01)
*G06F 3/00* (2006.01)
*H04N 7/173* (2006.01)

(52) U.S. Cl. .............................. 725/39; 725/44; 725/52

(58) Field of Classification Search ................... 725/39, 725/44, 52
See application file for complete search history.

(56) References Cited

U.S. PATENT DOCUMENTS

| | | | |
|---|---|---|---|
| 5,982,445 A | 11/1999 | Eyer | |
| 5,990,969 A | 11/1999 | Bril | |
| 6,141,003 A | 10/2000 | Chor | |
| 6,201,538 B1 | 3/2001 | Wugofski | |
| 6,240,555 B1 | 5/2001 | Shoff | |
| 6,396,473 B1 | 5/2002 | Callahan et al. | |
| 6,400,407 B1 | 6/2002 | Zigmond | |
| 6,928,652 B1 | 8/2005 | Goldman | |
| 7,076,792 B2 | 7/2006 | Zigmond | |
| 2005/0005302 A1 | 1/2005 | Zigmond | |

FOREIGN PATENT DOCUMENTS

JP 2000347645 * 3/2000

OTHER PUBLICATIONS http://www.w3.org/TR/REC-CSS2/Visuren.html, May 12, 1998, Cascading Style Sheetrs Level 2, CSS2 Specification: Section 9.9.1 Specifiying the stack level: the 'z-index' property.*

(Continued)

*Primary Examiner*—Hunter B. Lonsberry
(74) *Attorney, Agent, or Firm*—Workman Nydegger

(57) ABSTRACT

Described are a method and apparatus for incorporating broadcast television into Web pages. Broadcast television can be embedded into Web pages using, for example, a "tv:" attribute in conjunction with common HTML tags. Within the "tv:" attribute, a Web-page author can reference a TV station by channel number, network, or broadcast call letters. HTML documents are parsed to recover both the conventional tags and tags that include TV attributes. The resulting Web pages display the identified broadcast TV in a frame specified by the TV attribute. One embodiment supports the presentation of television in the background of an HTML document. In that embodiment, HTML tags corresponding to overlying HTML content are provided with an attribute that defines a level of transparency from zero to one-hundred percent. The transparency attribute allows content providers to overlay any type of HTML information over a broadcast television show without completely obscuring the underlying show. This aspect of the invention employs a z attribute that can be used to specify the relative position of broadcast television and overlying HTML content.

22 Claims, 6 Drawing Sheets

OTHER PUBLICATIONS http:Illists.w3.orglArchives/Public/www-tv/1999octDec/OOOO. html, Dan 7igmond, Oct. 7, 1999.* http://lists.w3.org/Archives/Public/www-tv/1998OctDec/0224. html, Craig Finseth, Dec. 30, 1998.* http://lists.w3.org/Archives/Public/www-tv/1999OctDec/0000. html, Dan Zigmond, Oct. 7, 1999.

Electronic Industries Association EIA-746A, "Transport of Internet Uniform Resource Locator (URL) Information using Text-2 (T-2) Service" (Sep. 1998).

Advanced Television Enhancement Forum Specification (ATVEF), Version 1.1 revision 26, (Feb. 2, 1999).

R. Panabaker, S. Wegerif, and D. Zigmond, "The Transmission of IP Over the Vertical Blanking Interval of a Television Signal," (Feb. 1999).

"Creating Interactive Television Links," http://developer.webtv.net/itv/links/main.htm (Jun. 9, 1999).

"Displaying Television Broadcasts in Web Pages," http://developer.erbtv.net/itv/embedtv.main.htm (Jun. 9, 1999).

Electronic Industries Association EIA-608, "Recommended Practice for Line 21 Data Service" (Sep. 1994).

Chapter 13, "Objects, Images, and Applets," HTML 4.0 Specification, W3C Recommendation revised on Apr. 24, 1998.

http://www.w3.org/TR/REC-CSS2/Visuren.html, May 12, 1998, Cascading Style Sheetrs Level 2, CSS2 Specification: Section 9.9.1 Specifying the stack level: the 'z-index' property.

http://lists.w3.org/Archives/Public/www-TV/1998OctDec/0224. html, Dec. 30, 1998, Applications List, Craig Finseth, pp. 2-3.

http://www.w3.org/TV/TVWeb/TVWeb-URI-Requirements.html, Mar. 11, 1999, TV Broadcast URI Schemes Requirements, Water ten Kate, Gomar Thomas, Craig Finseth.

http://www.atvef.com/library/spec1_1a.html, 1998, 1999, ATVEF Enhanced Content Specification.

Office Action dated Dec. 19, 2001 cited in U.S. Appl. No. 09/467,764.

Office Action dated Jul. 3, 2002 cited in U.S. Appl. No. 09/467,764.
Office Action dated Jan. 29, 2003 cited in U.S. Appl. No. 09/467,764.
Office Action dated Jul. 16, 2003 cited in U.S. Appl. No. 09/467,764.
Notice of Allowance dated Apr. 2, 2004 cited in U.S. Appl. No. 09/467,764.

Office Action dated Aug. 10, 2005 cited in U.S. Appl. No. 10/893,714.

Office Action dated Jan. 12, 2006 cited in U.S. Appl. No. 10/893,714.
Notice of Allowance dated Apr. 6, 2006 cited in U.S. Appl. No. 10/893,714.

* cited by examiner

DOCUMENT DATA STRUCTURE AND METHOD FOR INTEGRATING BROADCAST TELEVISION WITH WEB PAGES

CROSS-REFERENCE TO RELATED APPLICATIONS

The present application is a continuation application of U.S. patent application Ser. No. 09/467,764 filed Dec. 20, 1999, entitled "Document Data Structure and Method for Integrating Broadcast Television with Web Pages", which is incorporated herein by reference.

BACKGROUND OF THE INVENTION

1. The Field of the Invention

The invention relates generally to the integration of broadcast television programming with other multimedia content. More specifically, the invention relates to methods and apparatus for integrating broadcast television images with pages available over the Internet.

2. Background and Related Art

The Internet is a worldwide collection of networks and gateways. The Internet includes a backbone of high-speed data communication lines between major nodes or host computers, consisting of thousands of commercial, government, educational, and other computer systems. The Worldwide Web (the Web) is composed of a vast number of uniquely addressed "pages" of information available on the Internet. The unique addresses, conventionally known as Universal Resource Identifiers (URIs), make it easy to establish links between related pages, and between pages and other information resources on the Web. Common types of URIs include URLs (Universal Resource Locators) and URNs (Universal Resource Names).

Information on a given page may be linked to related information on a second page by providing a "hyperlink," or "link," specifying the URI of the second page. Such links are typically represented as highlighted text or graphic representations that may be selected using a mouse-type pointer (a "mouse"). Users move between pages on the Internet by selecting links according to the user's interest. This method of moving from page to page on the Internet in search of information is commonly referred to as "surfing the Net."

The Web has become a popular resource for information relating to almost any subject. The growth of this popularity has been greatly enhanced by the development of standard generalized markup languages (SGML), in particular the hypertext markup language (HTML) and, more recently, the Extensible Markup Language (XML). Markup languages define the format of Web documents by establishing the syntax and placement of special, embedded instructions that tell Web browsers how to display the contents of a document. HTML and XML also interconnect Web pages and other information resources using hyperlinks. HTML is presently the most popular markup language used to author Web content. The following discussion therefore focuses on HTML, although the concepts discussed apply equally to other markup languages.

FIG. 1 (prior art) is a flowchart 100 depicting how a conventional browser or Internet terminal renders a stream of HTML data 110 to display a Web page 120. Beginning at step 130, a software object called an HTML parser parses HTML data 110. The term "software object" is used here in the context of object-oriented programming, and refers to a variable comprising both routines and data that is treated as a discrete entity.

Parsing HTML data 110 produces a series of HTML tags and attributes 140. Tags are code that identifies an element in a document, such as a heading or a paragraph, for the purposes of formatting, indexing, and linking information in the document. Attributes are name-value pairs within a tagged element that modify certain features of that element. These features include color, size, position, and the size and style of fonts.

Next, a software object typically referred to as a "document builder" 150 interprets tags and attributes 140. The interpretation results in the creation of a document data structure 160 that contains all of the formatting and content information required to render HTML page 120. The content information can include links to other information resources, such as video, images, and other Web pages to be displayed within the confines of HTML page 120. Finally, a graphics processor and related software interpret data structure 160 to render the image of HTML page 120 (the HTML document) for display.

Internet terminals, such as those pioneered by WebTV Networks, Inc., provide Web access without a traditional personal computer. Internet terminals (also commonly referred to as set-top boxes) provide Web access using an ordinary television (TV) set as a display and a remote control or wireless keyboard for user input. These Internet terminals allow viewers to view Web content, watch television, or simultaneously do both by displaying broadcast TV within a window of a Web page. TV viewed within a Web page is not part of the HTML document defining the page, but must be incorporated separately using dedicated software. While the results are acceptable, there is nevertheless a need for a simpler method of merging HTML and broadcast TV content.

On occasion, it is desirable to display graphic images over broadcast video without completely obscuring the video. Such a mode of operation permits the viewer to continue to watch, for example, a favorite television program, while nevertheless monitoring the progress of e.g. a breaking news story or a live game score. Conventional Internet terminals, such as that available from WebTV, Inc., offer this functionality. However, the melding of HTML content and broadcast television is currently a complex process. Further, conventional Internet terminals do not support the use of television in the background of an HTML document. The need for a simple means of combining HTML and broadcast TV content therefore encompasses a need for a method that supports broadcast TV background for Web pages.

BRIEF SUMMARY OF THE INVENTION

A method and system are described for incorporating broadcast television into Web pages. In accordance with the invention, broadcast TV can be embedded into Web pages using, for example, a "tv:" URI in conjunction with common HTML tags, such as the image tag "<IMG>," the object tag "<OBJECT>," and the background tag "<BACKGROUND>." Within the "tv:" attribute, a Web-page author can reference a broadcast TV station by channel number, network, or broadcast call letters. In accordance with the invention, HTML documents are parsed to recover both the conventional tags and tags that include TV attributes. The resulting Web pages display the identified broadcast TV in a frame specified by the TV attribute.

One embodiment of the invention supports the presentation of television in the background of an HTML document. In that embodiment, HTML tags corresponding to overlying HTML content are provided with an attribute that defines a level of transparency. The transparency attribute allows content providers to overlay any type of HTML information over a broadcast television show without completely obscuring the underlying show. This aspect of the invention also employs a z attribute that can be used to specify the relative position of broadcast television and overlying HTML content.

Other features of the present invention will be apparent from the accompanying drawings and from the following detailed description.

DETAILED DESCRIPTION OF THE PREFERRED EMBODIMENTS

Figure 2:
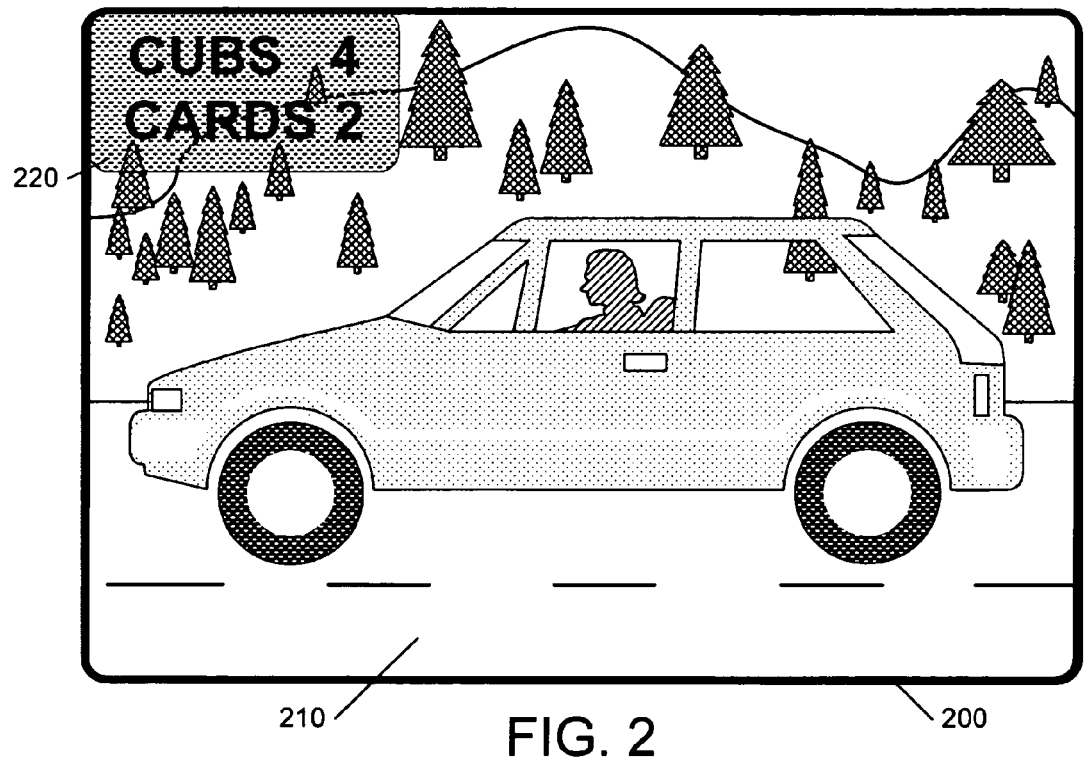
FIG. 2 depicts a video display 200 displaying a background video image 210 overlaid with a transparent HTML image 220.

FIG. 2 depicts a video display 200 displaying a background video image 210 overlaid with a transparent HTML image 220. For illustrative purposes, video image 210 is a mountain scene that includes a car and driver, and HTML image 220 is a baseball-game score box. The transparency of HTML image 220 permits concurrent viewing of background video image 210 and the baseball scores. The following HTML document defines the collective HTMl, image 220 and video image 210 in one embodiment of the invention.

```
<HTML>
    <BODY background="tv:"> <img src="scoreimg.png">
    </BODY>
</HTML>
```

In accordance with the invention, background video image 210 can be any video image, including broadcast TV. Also in accordance with the invention, background video image 210 is incorporated into the foregoing HTML page along with HTML image 220 for display on video display 200. Video image 210 and HTML image 220 can thus be transmitted to an Internet terminal as a single HTML page. This allows HTML authors to specify the source of broadcast TV to be displayed within or behind a given Web page.

Broadcast TV is added to a page as an object tag using the following syntax:

```
<object data="tv:" width="60%" height="60%">
```

The use of the object tag to extend HTML function complies with HTML Specification 4.0 "HTML 4.0 Specification, W3C Recommendation," revised on Apr. 24, 1999. The HTML Specification is incorporated herein by reference.

TV may also be added to a Web page that uses tables. For example:

```
<td width=320 height=240 style="background: url(tv:)"> Here
is content that is overlaid on top of the TV picture inside this
table cell.
</td>.
```

TV added to the background of a Web page is formatted as:

```
<body style="background: url(tv:)">
```

The foregoing examples were taken from Appendix A of the "Advanced Television Enhancement Forum Specification (ATVEF)," Version 1.1r26 (updated Feb. 2, 1999). The ATVEF Specification is incorporated herein by reference.

HTML image 220 is not limited to simple text. Other potentially useful graphic overlays include motion pictures, stock-market price displays, network or affiliate identifier logos, advertisements or announcements, news bulletins, a sketch-pad, a simulated keyboard, or interactive game boards. Graphic overlay images can include any subject that is usefully viewed when blended on screen with any other subject and overlaid for concurrent viewing of both subjects on the same display screen.

Figure 3:
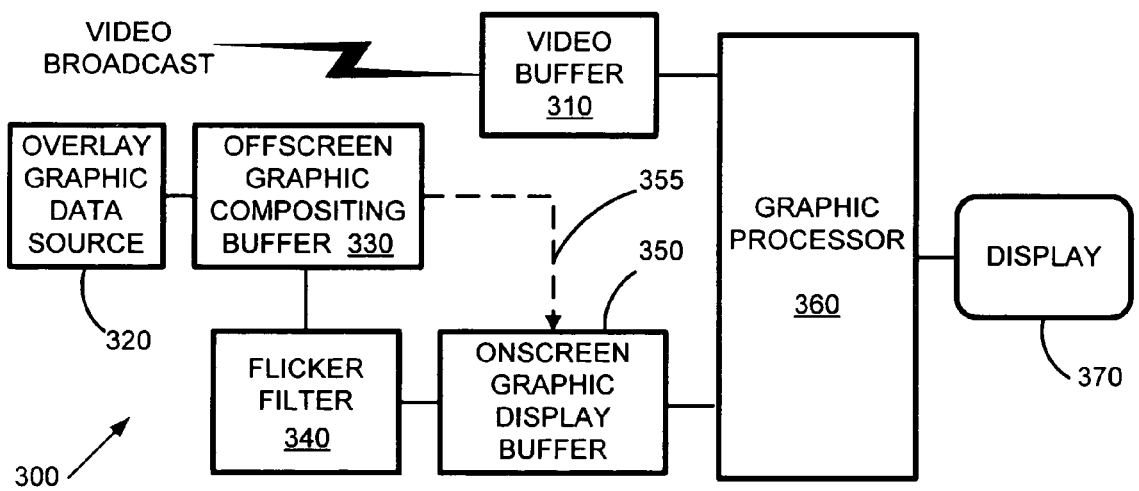
FIG. 3 is a block diagram illustrating a system 300 for blending a graphic overlay window with a background video image in accordance with the invention.

FIG. 3 is a block diagram illustrating a system 300 for blending a graphic overlay window with a background video image in accordance with the invention. Video background source material defines an array of pixels coextensive with the entire visible portion of display 200. This pixel array—labeled "VIDEO BROADCAST"—might represent a television program or other cable, broadcast, satellite, or graphic presentation.

The video broadcast or other remote graphic overlay image data is buffered in a video buffer 310. An overlay graphic data source 320 feeds data to an off-screen graphic compositing buffer 330 in which data processing is performed on successive frames of the graphic image to update the graphic image as instructed. For example, HTML image 220 of FIG. 2 could be changed to update the depicted baseball scores. Such processing may be performed, for example, by a microprocessor (not shown) that operates the home entertainment system of which the illustrated overlay and display apparatus is a part.

The contents of off-screen graphic compositing buffer 330 may be filtered in a flicker filter 340 prior to being buffered in an onscreen graphic display buffer 350. Flicker filter 340 filters data presented to off-screen graphic compositing buffer 330 to reduce flicker. If flicker is not a problem, flicker filter 340 (may be eliminated; as indicated by dashed arrow 355.

Onscreen graphic display buffer 350 and video buffer 310 feed a graphic processor 360. Graphic processor 360 blends the two graphic sources to produce a raster scan signal for presenting blended data on a conventional display 370. Graphic processor 360 may be a special- or general-purpose microprocessor capable of performing graphic operations. Display 370 may be any suitable monochrome or color display.

Video buffer 310 and display buffer 350 feed data to graphic processor 360, which blends their contents and presents the results on display 370. Such blending is performed using intensity, commonly known as "alpha" information, stored in any suitable format along with the accompanying pixel information in the onscreen graphic display buffer 350. For more information relating to the operation of system 300, see the co-pending application Ser. No. 09/229,454 entitled "Overlay Graphics Memory Management Method And Apparatus," by David R. Anderson and Sean M. Callahan, filed Apr. 22, 1999, which is incorporated herein by reference.

Figure 1:
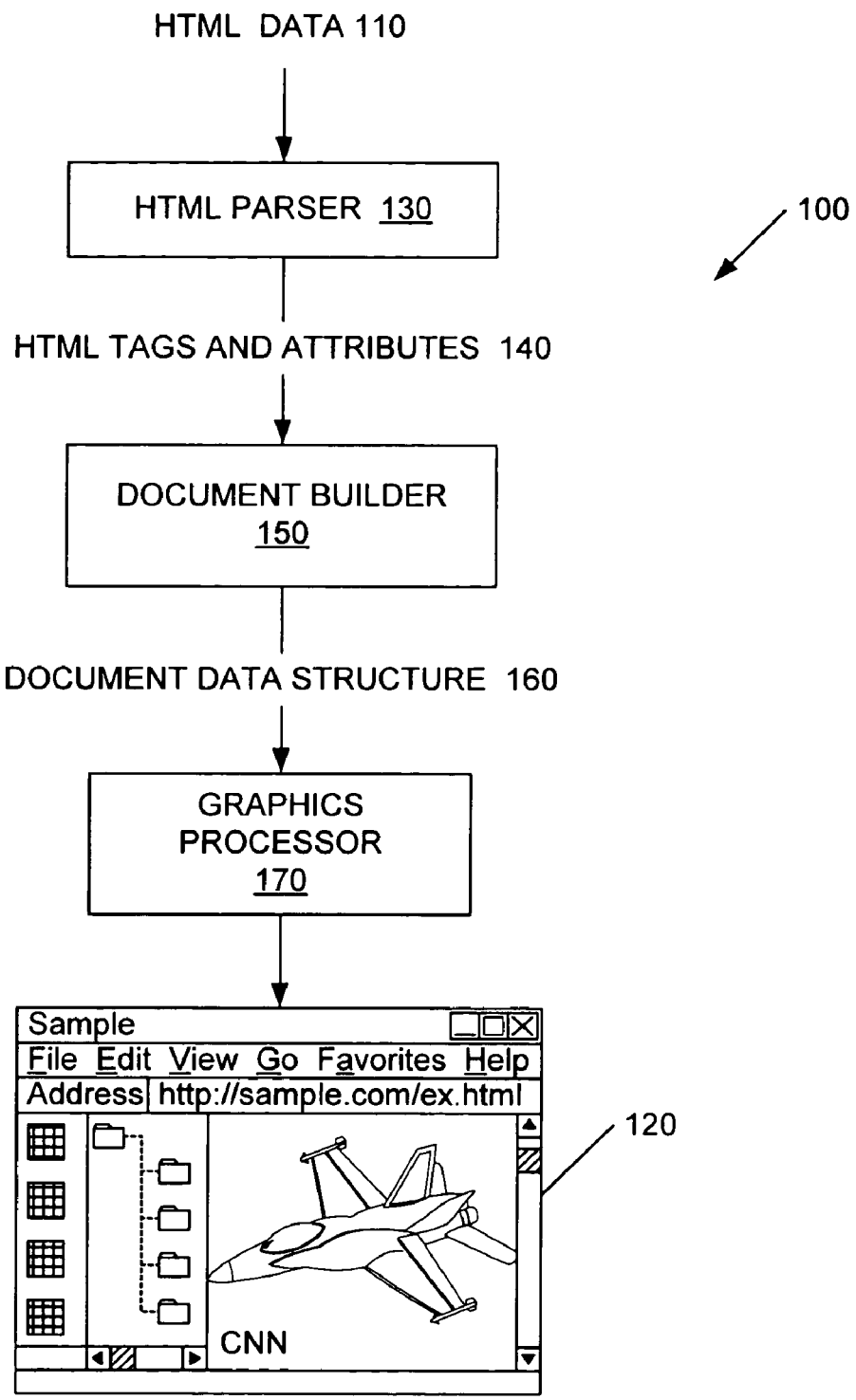
FIG. 1 (prior art) is a flowchart 100 depicting how a conventional browser or Internet terminal renders a stream of HTML data 110 to display a Web page 120.
Figure 4:
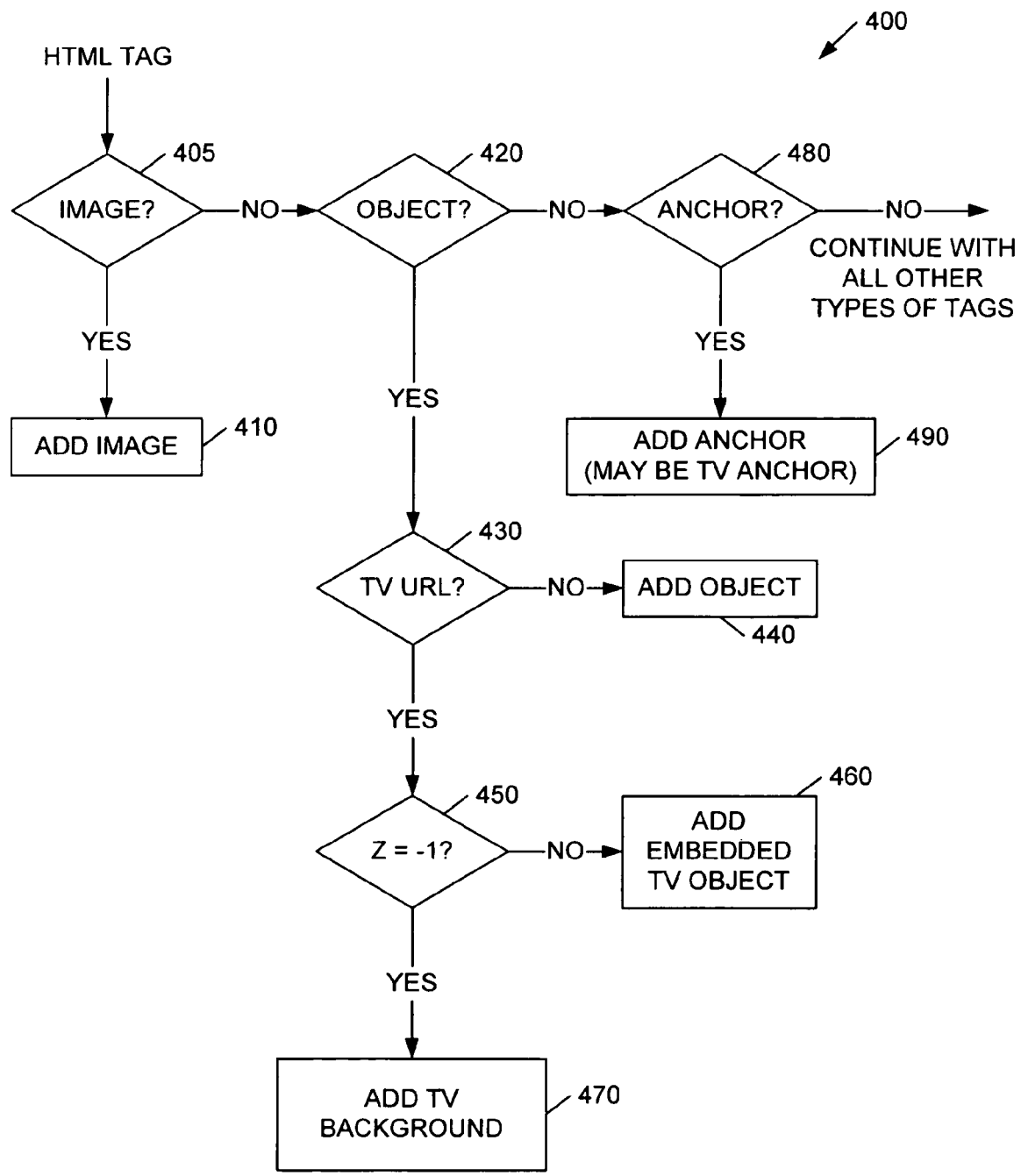
FIG. 4 is a flowchart 400 depicting the operation of a document builder modified in accordance with the invention.

Internet terminals in accordance with the present invention provide the same functionality as the conventional system described above in connection with FIG. 1. In one embodiment, the inventive Internet terminal is fully compliant with above-incorporated HTML 4.0 Specification. The document builder is modified, however, to interpret hyperlinks to broadcast TV and to display background TV behind transparent HTML content. FIG. 4 is a flowchart 400 depicting the operation of the modified document builder.

The novel document builder subjects each HTML tag to a sequence of decisions that collectively determine what type of information will be displayed. These decisions incrementally produce a document data structure that contains all of the formatting and content information required to render a Web page. An exemplary document data structure is described below in connection with FIG. 5.

Returning to FIG. 4, the first decision 405 upon receipt of an HTML tag determines whether the tag is an image tag. If it is, then the document builder begins (or continues) building the document data structure by including the requisite information for defining the identified image (step 410). If the HTML tag is not an image tag, the document builder determines whether the tag is an object tag (step 420). The term "object," when referring to object tags, should not be confused with software objects in object-oriented programming. Chapter 13 of the above-incorporated HTML 4.0 Specification uses the term "object" to describe things that authors want to place in HTML documents. Other commonly used terms for such objects are applets, plug-ins, and media handlers. The same HTML specification defines "object tags" as elements that allow HTML authors to specify everything required by an object for its presentation by a user agent: source code, initial values, and run-time data.

If the HTML tag is an object tag, the document builder determines whether the tag includes a URI to a TV resource, such as a "TV URL" (step 430). This feature of the document builder is new, as conventional HTML pages do not include TV URIs. Like other types of HTML tags, TV tags can include associated attributes. For TV tags, these attributes include channel number or network designation, image width, image height, "full screen" (i.e., ignore width and height), input source, z position, and image transparency.

Objects, other than TV objects, are added to the document data structure (step 440). TV tags are examined further to determine whether HTML attributes associated with the TV tag indicate that the TV object is to be viewed in the background (step 450).

The relative position of the TV object is determined using z-ordered (three-dimensional) cascading style sheets. As is known in the art, cascading style sheets allow HTML authors to include typographical information to define how a Web page should appear. The present invention makes use of a z attribute supported by cascading style sheets to determine the apparent relative positions of background television and overlaying HTML content. To establish broadcast television as background, the z attribute of the TV tag is, in one embodiment, set to "Z=−1." For example:

```
<div style="POSITION: ABSOLUTE; Z-INDEX:-1">
<object data="tv:" height=100% width=100%>
</object>
</div>
```

If, in step 450, the z attribute is greater than or equal to zero, then the broadcast television associated with the TV tag is embedded in the document data structure. If, on the other hand, the z attribute is less than zero, then the information required to instantiate broadcast TV in the background is added to the document data structure (step 470).

If the Internet terminal determines in step 420 that the HTML tag is not an object tag, then the Internet terminal next checks to see whether the tag corresponds to: an anchor (step 480). As is well known, anchors are tags that define a section of text, an icon, or other element as a link to another element in the document or to another document or file. Anchors are conventionally incorporated into the document data structure (step 490). In accordance with the invention, anchors may comprise a TV URI that identifies a broadcast TV source.

Finally, if the Internet terminal determines in step 480 that the HTML tag is not an anchor tag, then the Internet terminal continues through each other type of HTML tag supported by the terminal. If no match is found, the tag is simply ignored. Otherwise, the terminal conventionally incorporates the appropriate information into the document data structure.

Figure 5:
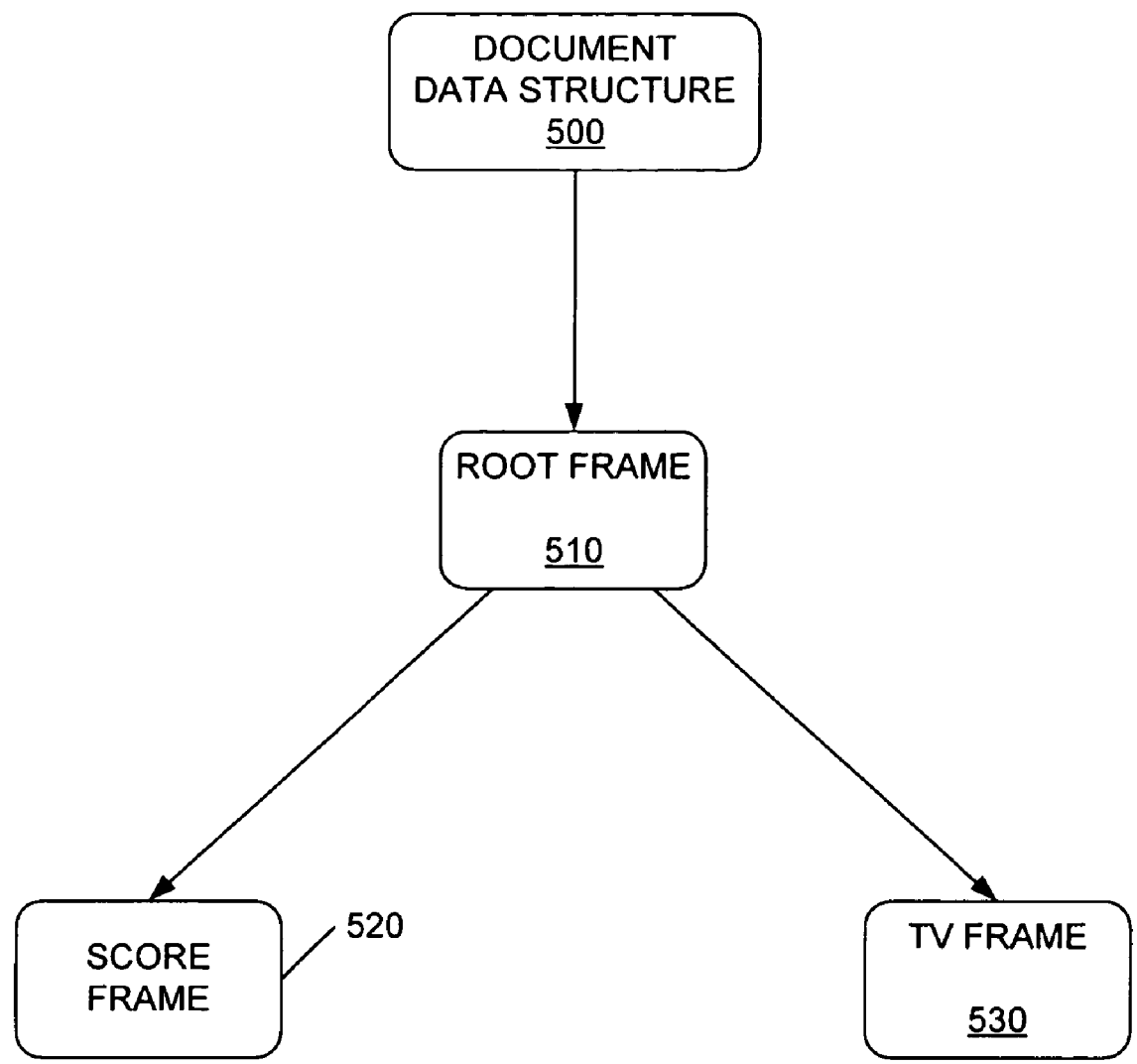
FIG. 5 depicts the tree structure of a sample document data structure 500 in accordance with the present invention.

FIG. 5 depicts the tree structure of a sample document data structure 500 in accordance with the present invention. The document is defined hierarchically as a tree comprising one or more "frames." Each frame is a section of a displayed Web page —typically rectangular—that is a separate HTML document from the rest of the page. Web pages can have multiple frames, each of which is a separate document. Each frame has the same capabilities as an unframed Web page, including linking to another frame or Web site; these capabilities can be used independently of other frames on the page.

Document data structure 500 defines a root frame 510, which in turn includes a score frame 520 and a TV frame 530. Score frame 520 includes the format and content information required to render transparent HTML image 210 of FIG. 2, while TV frame 530 includes the format and content information required to render background video image 210, also of FIG. 2.

Figure 6:
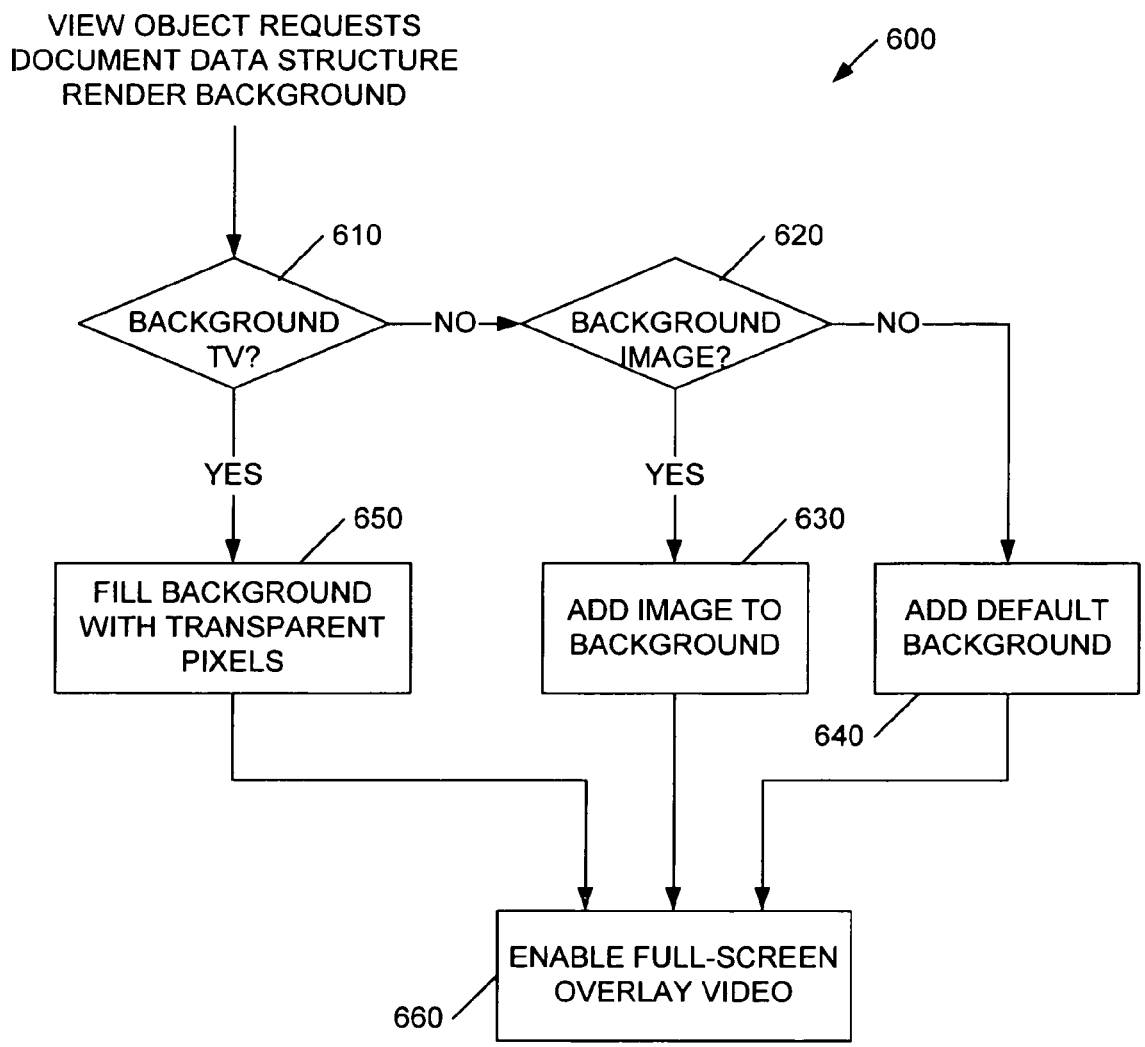
FIG. 6 is a flowchart 600 describing the process of adding broadcast television to the background of an HTML page.

FIG. 6 is a flowchart 600 describing the process of adding broadcast television to the background of an HTML page. The document data structure provides this functionality when called upon to render the background of an HTML page. The call to render the background typically comes from a software object called a "view object." The view object, allocated a certain about of screen space, conventionally interprets the contents of the document data structure to render the HTML page on a display. For example, the view object keeps track of the scroll position of a page and the relative placement of one or more overlapping pages.

The document builder first determines whether the background is specified as TV (step 610). If not, then the document builder determines whether the background is specified as an image (step 620). If the background is an image, then the image is added to the background by filling display buffer 350 (FIG. 3) with pixels representing the image (step 630). The image may be of any type, from a solid color to a photograph, for example. If the background is neither TV nor an image, then the document builder fills display buffer 350 with pixels of some default color, typically gray (step 640).

Returning to decision 610, if the background is specified as television, then display buffer 350 is filled with "transparent" pixels (step 650). Consequently, the contents of video buffer 310 show through when the contents of buffers 350 and 310 are combined (FIG. 3). Next, some HTML content, such as HTML image 220 (FIG. 2), is overlaid on the displayed video by providing rendered HTML image data to display buffer 350 (step 660). The concepts of "background" and "overlay" are not physical, but refer instead to the apparent positions of displayed images.

In accordance with an embodiment of the invention, all HTML tags are provided with an attribute that defines a level of transparency. This HTML extension complies with the requirements of the above-incorporated HTML 4.0 Specification. The transparency attribute allows content providers to overlay any type of HTML information over motion video without completely obscuring the video.

The hardware described in connection with FIG. 3 supports the transparency attribute. Transparency is conventionally determined using an "alpha" value for each pixel. In one embodiment, for example, the transparency of each pixel can have level of from zero to 255, zero corresponding to total transparency and 255 corresponding to total opacity. For more information regarding the implementation of transparent pixels, see the above-incorporated application entitled "Overlay Graphics Memory Management Method and Apparatus."

Figure 7:
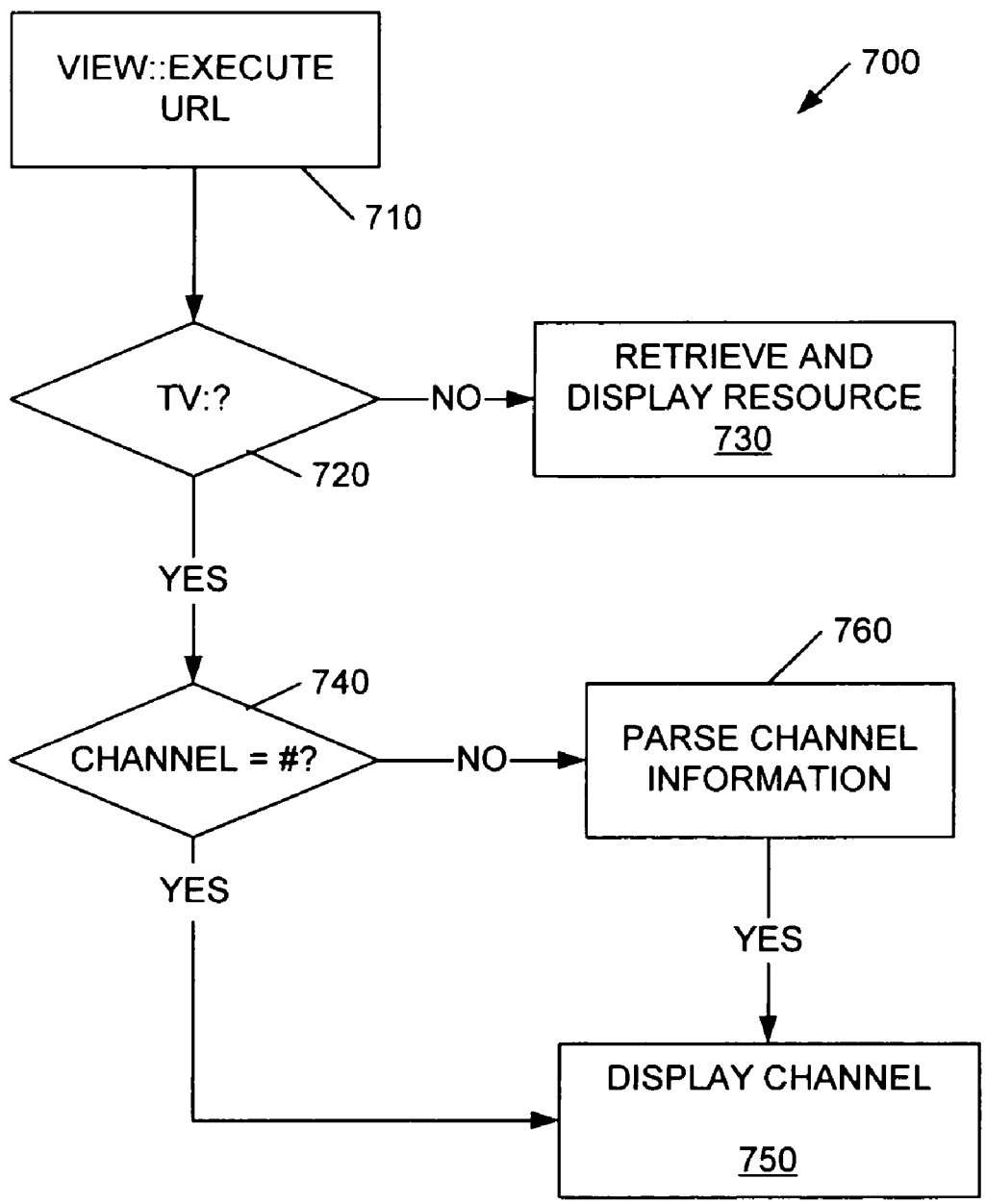
FIG. 7 is a flowchart 700 depicting the operation of a view object modified in accordance with the invention to accommodate hyperlinks to broadcast TV.

FIG. 7 is a flowchart 700 depicting the operation of a view object modified in accordance with the invention to accommodate hyperlinks to broadcast TV. Users execute hyperlinks, typically by selecting them with a mouse or other pointing device. Alternatively, hyperlinks can be exercised automatically upon the loading of a page, or can be triggered remotely using broadcast trigger messages, or "triggers." Triggers are broadcast instructions that generally instruct Internet terminals to take a specific action to synchronize the content of a Web page with a broadcast television program. However a hyperlink is selected, executing a hyperlink initiates a call 710 to the view object.

If the selected link does not refer to a TV resource, as determined in step 720, then the Internet terminal retrieves and displays the information resource in a conventional manner (step 730). If the selected hyperlink includes a TV URI, however, then the view object examines a channel attribute of the TV URI to determine which channel should be displayed (step 740). The view object reacts to TV URIs having numeric channel attributes (e.g., channel 7) by simply displaying the indicated channel (step 750). An exemplary call to a TV URI might be "href=tv:channel7" for a call to display channel 7.

Channel attributes may identify particular television networks by call letters. For example, the call letters "CNN" could identify the Cable News Network, in which case the call to a TV URI might read "href=tv:cnn." Because television networks are not shown on the same numerical channel in every geographic location, call-letter attributes are parsed and mapped to local channels. This is accomplished using a conventional electronic programming guide, which is a database that maps local channels to network stations (step 760) using knowledge of a viewer's zip code and local cable provider. The Internet terminal displays the appropriate channel once the call letters are parsed (step 750). If no call letter or channel is specified, the Internet terminal displays the last channel viewed. For example, an HTML anchor for linking to full-screen TV of the last channel viewed might be instantiated as <a href="tv:">Click here to return to TV</a>.

For additional information about integrating broadcast TV and HTML content, see

1. "Displaying Television Broadcasts in Web Pages," published on the Internet by WebTV, Inc., at
2. http://developer.webtv.net/itv/embedtv/main.htm (Jun. 9, 1999; and
3. "Creating Interactive Television Links," published on the Internet by WebTV, Inc., at http://developer.webtv.net/itv/links/main.htm (Jun. 9, 1999).

Both of the foregoing documents are incorporated herein by reference.

While the present invention has been described in connection with specific embodiments, variations of these embodiments will be apparent to those of skill in the art. Therefore, the spirit and scope of the appended claims should not be limited to- the foregoing description.

What is claimed is:

1. A method for enabling the display of a television broadcast containing video images as part of a markup-language document, the method comprising one or more microprocessors performing the following:
   incorporating markup-language tags and markup-language attributes into a mark-up language document that together determine the format and content of the markup-language document; and
   incorporating an object tag into the markup-language document that identifies a URI of a television resource, the television resource identifying a television broadcast source;
   wherein one or more of the markup-language tags include a z attribute specifying a z position for the corresponding one or more markup-language tags, and wherein at least one of the one or more markup-language tags specifies the z position of the broadcast video images to be with respect to other parts of the markup-language document and wherein the video images of the television broadcast are displayed in accordance with the relative z position specified in the z attribute of the at least one of the one or more mark-up tags.

2. A method as recited in claim 1, wherein the markup-language document is received by a system that parses the markup-language data to recover the markup-language tags, markup-language attributes, and object tag.

3. A method as recited in claim 2, wherein the system displays video images of the television broadcast in accordance with the relative z position specified in the z attribute of the at least one of the one or more markup-language tags.

4. A method as recited in claim 3, wherein displaying the video images includes filling a graphic display buffer with information representing transparent pixels.

5. A method as recited in claim 3, wherein displaying the video images includes:
   storing the video images in a video buffer;
   storing the information representing transparent pixels in a graphic display buffer; and
   combining the information with the video images.

6. A method as recited in claim 1, wherein the z attribute indicates that the video images should be displayed as background in the markup-language document.

7. A method as recited in claim 1, wherein the one or more markup-language tags is associated with a still image.

8. A method as recited in claim 1, wherein the at least one of the one or more markup-language tags is either an object tag or an image tag.

9. A computer program product comprising one or more computer-readable media having computer-executable instructions for implementing a method for enabling the display of a television broadcast containing video images as part of a markup-language document, the method comprising one or more microprocessors performing the following:

incorporating markup-language tags and markup-language attributes into a mark-up language document that together determine the format and content of the markup-language document; and incorporating an object tag into the markup-language document that identifies a URI of a television resource, the television resource identifying a television broadcast source;

wherein one or more of the markup-language tags include a z attribute specifying a z position for the corresponding one or more markup-language tags, and wherein at least one of the one or more markup-language tags specifies the z position of the broadcast video images to be with respect to other parts of the markup-language document and wherein the video images of the television broadcast are displayed in accordance with the relative z position specified in the z attribute of the at least one of the one or more mark-up tags.

10. A computer program product recited in claim 9, wherein the markup-language document is received by a system that parses the markup-language data to recover the markup-language tags, markup-language attributes, and object tag.

11. A computer program product as recited in claim 10, wherein the system displays video images of the television broadcast in accordance with the relative z position specified in the z attribute of the at least one of the one or more markup-language tags.

12. A computer program product as recited in claim 10, wherein displaying the video images includes filling a graphic display buffer with information representing transparent pixels.

13. A computer program product as recited in claim 11, wherein displaying the video images includes:
storing the video images in a video buffer;
storing the information representing transparent pixels in a graphic display buffer; and
combining the information with the video images.

14. A computer program product as recited in claim 9, wherein the z attribute indicates that the video images should be displayed as background in the markup-language document.

15. A computer program product as recited in claim 9 wherein the one or more markup-language tags is associated with a still image.

16. A computer program product as recited in claim 9, wherein the at least one of the one or more markup-language tags is either an object tag or an image tag.

17. A method for displaying a stream of television broadcast video images as part of a markup-language document, the method comprising one or more microprocessors performing the following:

incorporating markup-language tags and markup-language attributes into a mark-up language document that together determine the format and content of the markup-language document; and incorporating an object tag into the markup-language document that identifies a URI of a television resource, the television resource identifying a television broadcast source;

wherein one or more of the markup-language tags include a transparency attribute specifying a level of transparency for one or more portions of the markup-language document to overly at least some of the television broadcast video images during display and wherein the television broadcast video images are displayed and the one or more portions of the markup-language document are overlaid in accordance with the level of transparency specified in the transparency attribute of the at least one of the markup-language tags.

18. A method as recited in claim 17, wherein the markup-language document is received by a system that parses the markup-language data to recover the markup-language tags, markup-language attributes, and object tag.

19. A method as recited in claim 18, wherein the system displays video images of the television broadcast and the overlying one or more portions of the markup-language document in accordance with the level of transparency specified in the transparency attribute of the at least one of the markup-language tags.

20. A computer program product comprising one or more computer-readable media having computer-executable instructions for implementing a method for displaying a stream of television broadcast video images as part of a markup-language document, the method comprising one or more microprocessors performing the following:

incorporating markup-language tags and markup-language attributes into a mark-up language document that together determine the format and content of the markup-language document; and incorporating an object tag into the markup-language document that identifies a URI of a television resource, the television resource identifying a television broadcast source;

wherein one or more of the markup-language tags include a transparency attribute specifying a level of transparency for one or more portions of the markup-language document to overly at least some of the television broadcast video images during display and wherein the television broadcast video images are displayed and the one or more portions of the markup-language document are overlaid in accordance with the level of transparency specified in the transparency attribute of the at least one of the markup-language tags.

21. A computer program product as recited in claim 20, wherein the markup-language document is received by a system that parses the markup-language data to recover the markup-language tags, markup-language attributes, and object tag.

22. A computer program product as recited in claim 21, wherein the system displays video images of the television broadcast and the overlying one or more portions of the markup-language document in accordance with the level of transparency.

* * * * *